Feb. 12, 1952 J. A. BAIRD 2,585,722

FREQUENCY DIVIDER

Filed Oct. 6, 1949 3 Sheets-Sheet 1

INVENTOR
J. A. BAIRD
BY N. S. Ewing
ATTORNEY

Feb. 12, 1952 J. A. BAIRD 2,585,722

FREQUENCY DIVIDER

Filed Oct. 6, 1949 3 Sheets-Sheet 2

INVENTOR
J. A. BAIRD
BY N. S. Ewing
ATTORNEY

Feb. 12, 1952 J. A. BAIRD 2,585,722

FREQUENCY DIVIDER

Filed Oct. 6, 1949 3 Sheets-Sheet 3

INVENTOR
J. A. BAIRD
BY N. S. Ewing
ATTORNEY

Patented Feb. 12, 1952 2,585,722

UNITED STATES PATENT OFFICE 2,585,722

FREQUENCY DIVIDER

Jack A. Baird, Rockaway, N. J., assignor to Bell Telephone Laboratories, Incorporated, New York, N. Y., a corporation of New York Application October 6, 1949, Serial No. 119,837

17 Claims. (Cl. 250—36)

This invention relates to oscillatory circuits and more particularly is concerned with systems for effecting frequency division through the use of cascaded oscillators which are controlled in their oscillations by voltage impulses obtained from a source of substantially constant frequency unidirectional impulses.

In a preferred embodiment, a pair of blocking oscillator circuits are operated in tandem. Unidirectional voltage impulses from a constant frequency source are simultaneously supplied to the input of each oscillatory unit. Voltage variations arising from oscillations in the first of these oscillators are combined with the unidirectional impulses from the controlling source in such manner that the second oscillator is subjected to pulses from the controlling source only when they do not coincide with voltage variations arising from the first oscillator. Through a proper choice of the natural oscillatory period of the oscillators, it is possible to materially increase the operating margin of the frequency dividing system.

In one embodiment of the invention, this increased operating margin is secured while at the same time the system is caused to be especially susceptible to control at an oscillation period that is equal to the interval between a desired even number of consecutive control pulses from the controlling source.

In a second embodiment of the invention, while the increased operating margin is retained, the system is caused to be especially susceptible to control at an oscillation period that is equal to the interval between a desired odd number of control pulses from said source. This latter arrangement utilizes a pulse feedback circuit arrangement in which the second or controlled oscillator in turn acts as a controlling force to reset the frequency dividing system after each cycle of operation.

Figure 1:
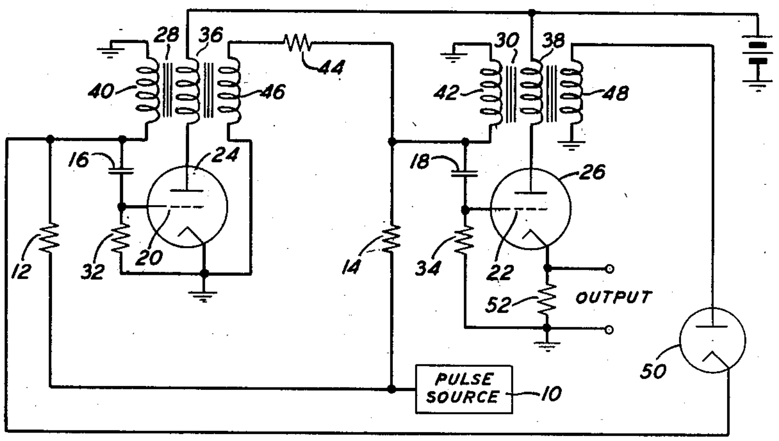
Figure 2:
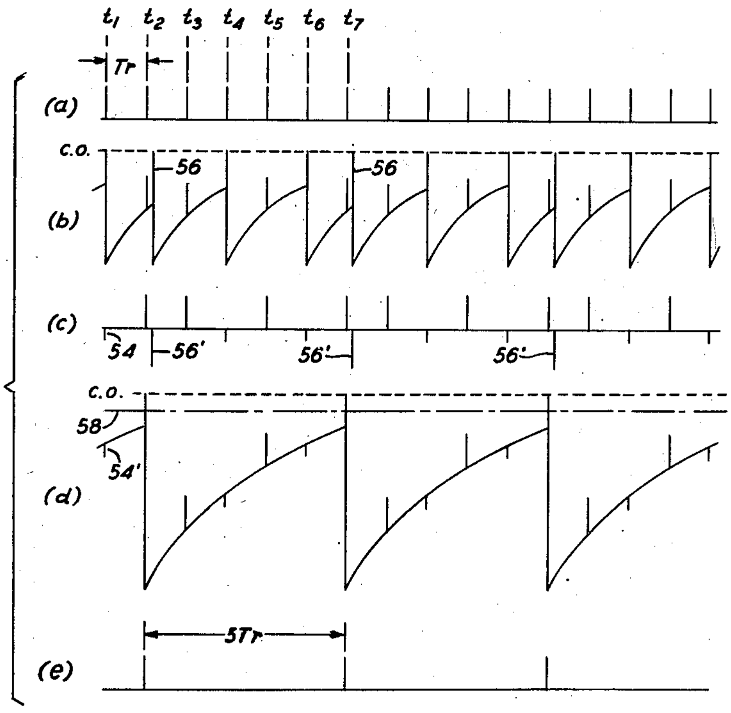
Figure 3:
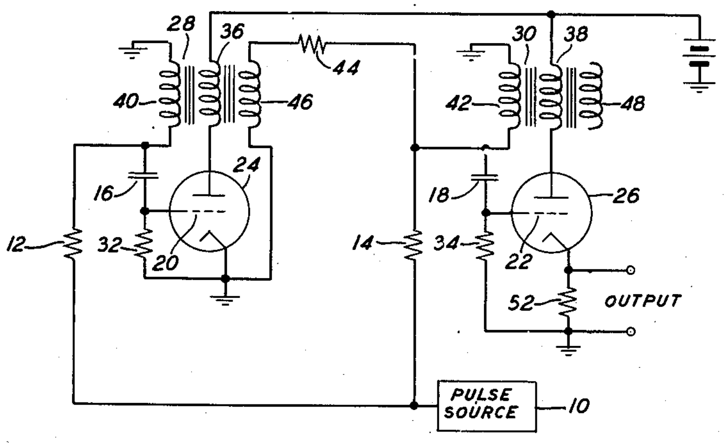
Figure 4:
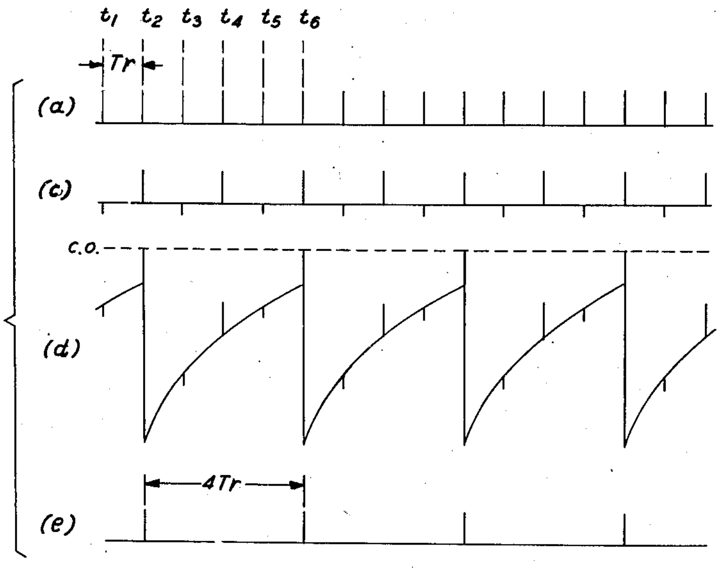
Figure 5:
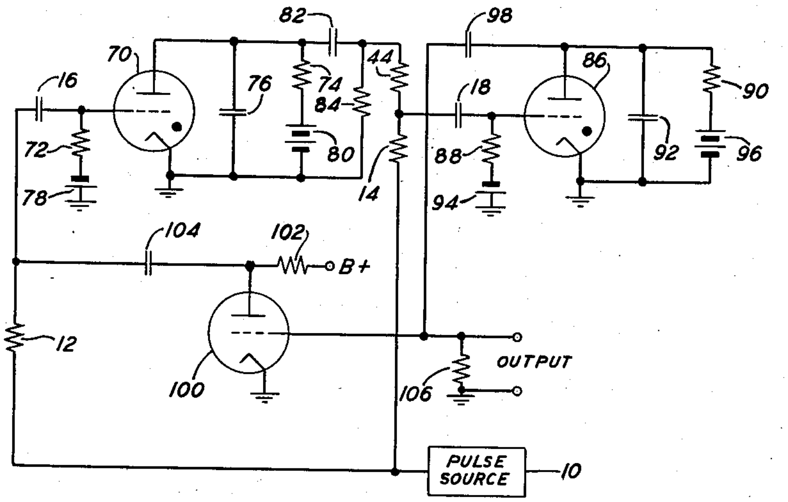
Figure 6:
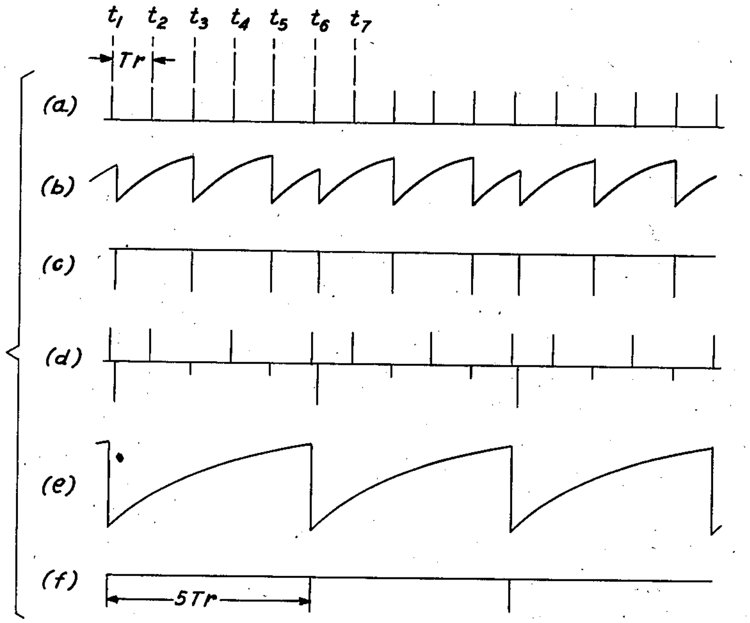

The manner in which the invention accomplishes the above-described functions may be best understood from the following detailed description of three embodiments thereof when considered in conjunction with the accompanying drawing, in which:

Fig. 1 discloses a frequency dividing system for odd integer frequency reduction;

Figs. 2, 4 and 6 are explanatory wave-form graphs to which reference is made in the following description;

Fig. 3 discloses a frequency dividing system for even integer frequency reduction; and Fig. 5 discloses a frequency dividing system alternative to that shown in Fig. 1 for odd integer frequency reduction.

Referring to Fig. 1, a train of substantially constant-frequency unidirectional voltage impulses which for the purpose of this explanation may be assumed to be but need not be positive voltage impulses spaced $T_r$ units of time apart, are supplied from pulse source 10 through isolating resistors 12, 14, and coupling capacitors 16, 18, to the control electrodes 20, 22, of electron discharge devices or vacuum tubes 24, 26. Each of these tubes, together with its associated coupling transformer 28, 30, and grid resistor 32, 34, constitutes a conventional relaxation oscillator of the so-called blocking tube type. Potential changes arising from current variations in the primary winding 36 or 38 of transformer 28 or 30, respectively, are coupled through the secondary windings 40, 42 and conjugate coupling capacitors 16, 18, to the control electrodes 20, 22.

The manner in which blocking tube oscillators of this type operate is well known, and it is believed that it need not be explained in detail herein. It will be recalled that the cut-off interval, during which the discharge device does not conduct current, is controlled by the magnitudes of the capacitor-resistor combination 16, 32, and 18, 34, in the input circuit of each oscillator. In the described embodiments of Figs. 1 and 3 it will be assumed, although the invention is not so limited, that the magnitudes of capacitor 16 and resistor 32 are chosen such that the first oscillator has a natural free-running frequency of oscillation slightly less than one-half the recurrence rate of the unidirectional voltage impulses supplied by source 10. Therefore, when the amplitude of the pulses from source 10 is properly adjusted, the first oscillator comprising discharge device 24 will be triggered or forced into conduction by every second pulse from source 10. In similar fashion, the magnitudes of capacitor 18 and resistor 34 in the second oscillator are chosen such that this unit has a natural free-running or uncontrolled frequency of oscillation which is slightly less than the desired integer-reciprocal of the pulse recurrence rate of source 10. Control electrode 22 of the second oscillator discharge device 26 is coupled to the anode-cathode circuit of the first oscillator device through capacitor 18, resistor 44, and auxiliary winding 46 of transformer 28. The poling of this winding 46 respective to winding 36 of this transformer is such that a negative voltage impulse is supplied through resistor 44 and capacitor 18 when current flow is initiated in discharge device 24. Therefore, when discharge device 24 is triggered, this negative voltage impulse is combined at the junction of resistors 14 and 44 with the alternate numbered positive voltage impulses from source 10. If the negative voltage impulse is suitably proportioned, it cancels or overrides at the junction of resistors 14, 44, the alternate positive voltage impulses from source 10, which are spaced two $T_r$ units of time apart. Winding 48 of transformer 30 is poled respective to winding 38 of this transformer in such fashion that a positive voltage impulse is coupled through the unilaterally conducting device or diode 50 to control electrode 20 of the first oscillator device 24 each time the second oscillator device 26 is triggered or forced into current conduction. When the circuit constants of the second oscillator device 26 are suitably proportioned, the voltage impulse so derived is large enough to force discharge device 24 into current conduction at a time slightly after one-half of its usual cut-off interval. Output pulses are generated across resistor 52 in the cathode circuit of discharge device 26 each time current conduction is initiated in this device.

The sequence of operations of the above-described device may be better understood with reference to the idealized wave-form diagrams of Fig. 2, in which voltage amplitudes are plotted against horizontal time units. Wave form (*a*) represents the train of unidirectional voltage impulses from source 10 which are separated $T_r$ time units apart; wave form (*b*) represents the change of potential on control electrode 20 and includes the superimposed voltage impulses from source 10; wave form (*c*) represents the voltage changes at the junction of resistors 14 and 44; wave form (*d*) represents the change in potential of control electrode 22 as the combined pulses at the junction of resistors 14 and 44 are superposed thereon; and wave form (*e*) represents the output voltage impulse generated across resistor 52.

For the purposes of this disclosure it is thought that a description of slightly more than one complete operating cycle will suffice. Therefore, the description is started at a time $t_1$ which is one pulse interval ahead of the time the second oscillator discharge device 26 is triggered. At time $t_1$, a voltage impulse from source 10 triggers device 24 and produces a negative voltage impulse in transformer winding 46 which when combined with the positive voltage impulse at the junction of resistors 14 and 44 results in a small negative voltage impulse 54 (Fig. 2 (*c*)). The combination of this small negative voltage impulse with the rising potential of control electrode 22 is shown at time $t_1$ by pulse 54' (Fig. 2 (*d*)). At time $t_2$, a second impulse from source 10 is coupled to control electrodes 20 and 22. The magnitude of this impulse is insufficient to increase the potential of electrode 20 to its cut-off potential C. O., but it is sufficient to increase the potential of control electrode 22 to its cut-off potential C. O., as shown in Fig. 2 (*d*). Conduction in tube 26 produces a voltage impulse of short duration across resistor 52, as is ideally indicated at time $t_2$, Fig. 2 (*e*). In addition, a positive voltage impulse is generated in winding 48 of transformer 30, which impulse is coupled through the anode-cathode circuit of the unilaterally conducting device or diode 50 to capacitor 16 and control electrode 20 of discharge device 24 in the first blocking oscillator. This pulse 56 (Fig. 2 (*b*)) is large compared to the pulses from source 10, and is of sufficient magnitude to increase the potential of control electrode 22 to its cut-off potential C. O., and to force current conduction in discharge device 24 at a time slightly greater than one-half of its usual cut-off period. In the explanatory wave forms (*b*) and (*c*) of Fig. 2, this fed-back pulse 56 and the resultant negative voltage impulse 56' at the junction of resistors 14, 44, are shown at a time slightly delayed from time $t_2$ in order to emphasize that they result from the operation of the second oscillator, and are not exactly coincident in time with the controlling pulse from source 10. Subsequent to time $t_2$, the potentials of both control electrodes 20 and 22 start to increase at their respective exponential rates, as is indicated by the curves Fig. 2 (*b*) and (*d*), respectively. At time $t_3$ the pulse from source 10 is ineffective in controlling either circuit, as is shown. At time $t_4$ the discharge device 24 is triggered; and there is produced the small negative voltage impulse at the junction of resistors 14 and 44 and on the rising potential of electrode 22, as is shown in Fig. 2 (*c*) and (*d*). Discharge device 26 cannot be triggered by this impulse from source 10 at time $t_4$ because it is effectively overcome or counteracted by the negative voltage impulse that is derived from the anode circuit of the first oscillator. The positive voltage impulse from source 10 at time $t_5$ is ineffective in controlling either discharge device 24 or 26. At time $t_6$ the input pulse is effective in forcing current conduction in discharge device 24. This positive voltage impulse is also supplied to electrode 22, and if it were not counteracted by the negative voltage impulse from transformer winding 46 it would momentarily increase the potential of control electrode 22 to a value indicated by the broken line 58. It will be noted that this combined potential (broken line 58) closely approximates the cut-off value C. O. Under these circumstances the oscillator might be prematurely reversed by small variations in the pulse amplitude or by extraneous impulses. As it is, and because this positive voltage impulse is completely overcome in the circuit of control electrode 22, the potential on electrode 22 at time $t_6$ is actually reduced below its normal exponential value, thereby increasing the operating margin of the potential on this electrode to a marked degree. The $t_7$ positive voltage impulse from source 10 does not trigger discharge device 24, but it does increase the potential of control electrode 22 of discharge device 26 to a value equal to or exceeding its cut-value C. O. Conduction in device 26 induces the previously-described positive voltage impulse in transformer winding 48, which impulse is applied to electrode 20 as a second and larger positive impulse 56 at a time just after $t_7$, Fig. 2 (*b*). Impulse 56 forces conduction in discharge device 24 and restarts the frequency-division cycle. Concurrently, with conduction in discharge device 26, a positive voltage impulse is produced across cathode resistor 52, which impulse is spaced five $T_r$ units of time from the preceding pulse generated across this resistor. Therefore, the train of voltage impulses from source 10 have been reduced to one-fifth of their original repetition rate.

The previously-described embodiment has been described as effecting a 5:1 reduction in the frequency of the applied impulses. It should be appreciated that the operation of this embodiment is not so limited, but rather that the reduction that will be effective in any given instance will be determined by the magnitudes of capacitor 18 and resistor 34. Thus, at the beginning of each frequency division cycle, after both discharge devices 24, 26, have been triggered, each alternate voltage impulse from source 10 is available to trigger discharge device 26 if it is of sufficient magnitude to increase the potential of control electrode 22 to a value equalling or exceeding its cut-off value C. O. Stated otherwise, this means that after discharge device 26 has been triggered, it may again be triggered at $(T_r+2nT_r)$ units of time later; where $n$ may be any suitable positive integer. Current conduction in discharge device 26 occurs each $(2n+1)$ $(T_r)$ units of time, where $n$ is principally determined by the magnitudes of capacitor 18 and resistor 34. Since the unidirectional pulses from source 10 occur at intervals of $T_r$ units of time, and the output pulses across resistor 52 occur at intervals of $(2n+1)$ $(T_r)$ units, it is apparent that the pulse repetition rate has been reduced by a factor of $(2n+1)$. As $n$ may be any suitable positive integer $(2n+1)$ is an odd integer; and division by odd integers only may occur. In the above described embodiment, $n$ was equal to 2, and a division by 5 occurred.

Referring now to Fig. 3, it will be noted that the circuit of this arrangement is the same as that of Fig. 1 with the exception that there are no connections to winding 48 of transformer 30. This change eliminates the pulse feedback path which comprises winding 48, the unilaterally conducting device or diode 50, and capacitor 16 (Fig. 1); and, hence, current conduction in discharge device 26 does not cause current conduction in the conjugate discharge device 24, as was the case in the previously-described embodiment. However, when device 24 is triggered by pulses from source 10, the negative voltage impulse that is generated in transformer winding 46 acts to cancel or overcome the positive voltage impulse from source 10 at the junction of resistors 14 and 44 in the previously-described manner. In addition to the foregoing, the circuit of Fig. 3 differs from that of Fig. 1 in that the magnitudes of capacitor 18 and resistor 34 may be changed to cause the natural or uncontrolled oscillation frequency of the second oscillator to be slightly less than one-fourth the pulse frequency of source 10.

The operation of the circuit of Fig. 3 will be explained with reference to the wave-form diagrams shown in Fig. 4. As in the previously-described example, wave form (*a*) shows the train of voltage impulses supplied by pulse source 10; wave form (*c*) shows the voltage at the junction of resistors 14 and 44; wave form (*d*) shows the change in potential on control electrode 22 of discharge device 26; and wave form (*e*) shows the output voltage pulses produced across cathode resistor 52. At time $t_1$, a voltage impulse from source 10 triggers discharge device 24 and when combined with the negative voltage impulse produced in transformer winding 46, produces at the junction of resistors 14 and 44 and on the rising potential of control electrode 22 the small negative voltage impulses which are shown in Fig. 4 (*c*) and (*d*). At time $t_2$, the impulse from source 10 does not trigger discharge device 24, and this pulse is available to increase the potential of control electrode 22 to a point equal to or in excess of its cut-off potential C. O., Fig. 4 (*d*). At this time an output pulse is generated across load resistor 52, Fig. 4 (*e*). At time $t_3$, discharge device 24 is triggered, and pulse cancellation occurs in the previously-described manner. At time $t_4$, discharge device 24 is not triggered and the positive voltage impulse from source 10 momentarily increases the potential of control electrode 22 to a value which is less than the cut-off value of this device, as is shown in Fig. 4 (*d*). At time $t_5$, discharge device 24 is triggered and pulse cancellation occurs in the previously-described manner. At time $t_6$, discharge device 24 is not triggered, and the positive voltage impulse from source 10 is sufficient to increase the potential of control electrode 22 to a value where current flow is initiated in device 26. At this time a second output impulse is generated across cathode resistor 52, as is indicated in Fig. 4 (*e*). From the foregoing, it will be noted that because of the pulse cancellation which occurred at the junction of resistors 14 and 44 at times $t_3$ and $t_5$, the operating margin of discharge device 26 was materially increased; and that instead of the potential of control electrode 22 being raised to a point just short of its cut-off value at time $t_5$, the potential on this electrode was actually momentarily lowered below its normal exponential value. It will also be noted that the output voltage impulse, Fig. 4 (*e*), is separated from its preceding member by a time interval equal to four $T_r$ units of time; and, therefore, that a reduction by 4 has been made in the repetition rate of the impulses from source 10.

In Fig. 5, there is shown a system for division by odd integers, which system is alternative to the circuit shown and previously described in connection with Fig. 1. The gas-filled electron discharge device 70, together with its associated resistors 72, 74, capacitor 76 and sources of potential 78, 80, constitutes a conventional condenser-discharge relaxation type of oscillator, the natural free-running frequency of oscillation of which is controlled by the magnitudes of resistor 74, capacitor 76 and potential sources 78 and 80. In this described embodiment, these circuit constants are assumed to be so chosen that the natural free-running frequency of oscillation of this oscillator is slightly less than one-half the repetition rate of the pulses from source 10. Similarly, the gas-filled electron discharge device 86, together with resistors 88, 90, capacitor 92 and potential sources 94, 96, form a second relaxation oscillator in which the components are so chosen that the natural free-running frequency of oscillation is sufficiently less than one-half that of the first oscillator that it is synchronized by the desired odd-integer pulse. In this description it will be assumed that these constants are so chosen that this oscillator is triggered or synchronized by each fifth pulse from source 10. The anode of the first oscillator is connected to the control electrode of discharge device 86 in the second oscillator through a pulse differentiating circuit including capacitor 82 and resistor 84, and resistor 44 and capacitor 18 in series.

As in the previously-described circuit of Fig. 1, the unidirectional pulses from source 10 are simultaneously supplied through resistors 12, 14, and capacitors 16, 18, to the control electrodes of the two gas-filled electron discharge devices 70, 86, in the first and second oscillators. Each time that current conduction is initiated in discharge device 70, a negative voltage impulse is differentiated by the capacitor 82-resistor 84 combination, which pulse is combined at the junction of resistors 14, 44, with the positive voltage impulse supplied from pulse source 10. Suitable proportioning of the circuit constants causes this negative voltage impulse to exceed in magnitude that of the positive voltage impulse from source 10 such that the combination of these two pulses, when applied to the control electrode of discharge device 86, results in momentarily lowering the potential of this element. The anode of discharge device 86 is connected through coupling capacitor 98 to the control electrode of an electron discharge device or triode 100 which includes in its anode circuit the load resistor 102, and whose anode circuit is coupled through capacitor 104 to the control electrode circuit of discharge device 70 in the first oscillator. Triode 100 operates as a pulse inverter and delivers to the control electrode circuit of discharge device 70 a positive voltage impulse of sufficient magnitude to cause current conduction in device 70 each time that current conduction is initiated in discharge device 86 of the second oscillator. Coupling capacitor 98, together with resistor 106, forms a pulse differentiating circuit to supply to the output terminals a short negative voltage impulse each time the gas-filled discharge device 86 conducts current.

In Fig. 6, there are shown the various voltage wave-form curves in idealistic form as they exist at various locations in the above-described circuit. In Fig. 6, curve (*a*) shows the train of unidirectional voltage impulses supplied from source 10; curve (*b*) shows the voltage variations at the anode of the gas-filled device 70; curve (*c*) shows the negative voltage impulses as differentiated across resistor 84; curve (*d*) shows the voltage variations occurring at the junction of resistors 14 and 44, which variations are caused by the positive voltage impulses from source 10 and the negative voltage impulses differentiated across resistor 84; curve (*e*) shows the potential change at the anode of discharge device 86 in the second oscillator; and curve (*f*) shows the frequency-reduced train of negative voltage impulses produced across output resistor 106.

Referring to these curves, at time $t_1$ the pulse from source 10 does not trigger device 70 but does trigger device 86. The anode voltage of device 86 decreases suddently, Fig. 6 (*e*), and produces a negative voltage impulse at the control electrode of triode 100 and at the output terminals, Fig. 6 (*f*). Triode 100 inverts this negative voltage impulse and produces at a time slightly later than $t_1$ a positive voltage impulse of sufficient magnitude to trigger discharge device 70 in the first oscillator with a consequent decrease in its anode potential and the production of a negative voltage impulse across resistor 84 and at the junction of resistors 14 and 44, as is shown by Fig. 6 (*b*), (*c*), and (*d*), respectively. At time $t_2$, the voltage impulse from source 10 does not disturb either discharge device 70 or 86. It should be noted that this pulse is available, Fig. 6 (*d*), at the control electrode of discharge device 86 to initiate current conduction in that tube if its anode potential has risen to a sufficiently high value. At time $t_3$, tube 70 is triggered or fired and produces the negative voltage impulse ,Fig. 6 (*c*), which when combined with the positive voltage impulse from source 10 at the junction of resistors 14 and 44 produces a small momentary lowering of the potential on the control electrode of device 86. The positive voltage pulse at time $t_4$ does not fire either tube since it does not raise the control electrode potential to a degree sufficient to initiate current conduction at the relatively low anode potential that exists at that time. The pulse at time $t_5$, which occurs at a time when the anode potential of tube 86 is approaching its maximum value, is cancelled at the junction of resistors 14, 44, and on the control electrode of this device 86 by the negative voltage impulse produced by the first oscillator discharge device 70 which is triggered by this same voltage impulse. At time $t_6$, the positive voltage impulse does not trigger device 70; it is not counteracted or cancelled on the control electrode of device 86 and, consequently, it initiates current conduction in this device to produce in its output circuit the negative voltage impulse, Fig. 6 (*f*), a portion of which is inverted in triode 100 and which causes conduction in discharge device 70 at a time just subsequent to time $t_6$. Hence, a cycle of operation of the discharge device 86 has produced an output pulse at time $t_5$, Fig. 6 (*f*), which is separated from its preceding impulse by an interval equal to five $T_r$ units of time. It is thus seen, as in the case of the circuit of Fig. 1, that a cycle of discharge device 86 will occur each $(T_r+2nT_r)$ units of time; where $n$ is a positive integer. This represents a frequency division of $(2n+1)$, which integer is always an odd number.

If the circuit of Fig. 5 is modified by the elimination of the pulse inverting circuit comprising triode 100 and its connection to the control electrode of gas discharge device 70, the frequency division will always be by an even-numbered integer, as was the case of the circuit shown in Fig. 3.

Although this invention has been described as being embodied in frequency-reducing or dividing systems which employ relaxation oscillators of specified types, it should be evident that its application is not limited to these types. This invention may be practiced through the use of other types of circuits, such as the multivibrator oscillator; the various types of trigger circuits, one of which is the Eccles-Jordan circuit; or other forms of related circuits of which several are known in the art. Similarly, although the described embodiments were shown as effecting frequency reductions of 4 or 5:1, it should be appreciated that the invention may be successfully practiced in systems in which a greater or lesser frequency reduction is effected.

What is claimed is:

1. A frequency dividing system comprising a pair of electron discharge devices each including an anode, a cathode, and a control electrode, a resistance connection between each control electrode and its conjugate cathode, an anode-cathode circuit for each device, said circuit including a source of anode potential and an inductive impedance intermediate said source and the anode, a source of voltage impulses the frequency of which is to be divided, said last-mentioned source being capacitively connected to the control electrode of each discharge device, an inductive coupling between each of said anode inductive impedances and the capacitive coupling to the conjugate control electrode, an inductive coupling between the anode inductive impedance of one of said discharge devices and the capacitive coupling to the control electrode of the other of said devices, means including an inductive coupling to the anode inductive impedance of said other device and a unilaterally conductive device for connecting positive voltage impulses from the anode-cathode circuit of said other device to the control electrode of said one device, a load resistor in the cathode circuit of said other device, and output terminals connected across said resistor.

2. A frequency dividing system comprising a pair of electron discharge devices each including an anode, a cathode, and a control electrode, associated circuits therefor including a source of anode potential, said devices and said associated circuits being arranged and proportioned to form a first and second relaxation oscillator, said second oscillator including a load resistor and output terminals thereacross, the natural frequency of oscillation of said second oscillator being less than one-half that of said first oscillator, a source of recurring voltage impulses, the frequency of which is to be divided and which is slightly greater than twice the natural oscillation frequency of said first oscillator, means for simultaneously supplying said voltage impulses to the control electrode of each oscillator discharge device, a pulse conductive circuit interconnecting the anode of said first oscillator discharge device and the control electrode of said second oscillator discharge device, and means including the anode-cathode path of a third electron discharge device for coupling the anode circuit of said second oscillator to the control electrode circuit of said first oscillator.

3. A frequency dividing system comprising a pair of electron discharge devices each including an anode, a cathode, and a control electrode, associated circuits therefor including a source of anode potential, said devices and said associated circuits being arranged and proportioned to form a first and a second relaxation oscillator, the natural frequency of oscillation of said second oscillator being less than one-half that of said first oscillator, means for simultaneously supplying to the control electrode of each of said devices a series of unidirectional voltage impulses, the frequency of repetition of which is slightly greater than twice the natural frequency of said first oscillator, pulse conductive circuit means connected to the control electrode of said second device for supplying thereto changes of potential arising from variations in the anode-cathode current in said first device, means for supplying to the control electrode of said first device changes of potential arising from variations in the anode-cathode current in said second device, and output terminals connected to the cathode-anode circuit for said second device.

4. The frequency dividing system as described in claim 3 in which said means for supplying to the control electrode of said first device changes of potential arising from variations in the anode-cathode current in said second device comprises a third electron discharged device and pulse conductive circuit means interconnecting the anode-cathode circuit of said third device intermediate the anode-cathode circuit of said second device and the control electrode-cathode circuit of said first device.

5. The frequency dividing system as described in claim 3, in which said means for supplying to the control electrode of said first device changes of potential arising from variations in the anode-cathode current in said second device comprising a pulse conductive circuit including an inductance and an electron discharge device, said inductance being inductively coupled to the anode-cathode circuit of said second device and being connected to the anode of said third electron discharge device, and the cathode of said third electron discharge device being connected to the control electrode circuit of said first electron discharge device.

6. A frequency dividing system comprising a pair of electron discharge devices each including an anode, a cathode, and a control electrode, associated circuits therefor including a source of anode potential, said devices and said associated circuits being arranged and proportioned to form a first and second relaxation oscillator, the natural frequency of oscillation of said second oscillator being less than one-half that of said first oscillator, a pulse conductive circuit coupling the anode-cathode circuit of said first discharge device and the control electrode-cathode circuit of said second discharge device, a load resistance in the cathode-anode circuit of said second device, output terminals connected across said resistance, and means for simultaneously supplying to the control electrode of each of said discharge devices a series of unidirectional voltage impulses, the frequency of repetition of which is slightly greater than twice the frequency of said first oscillator.

7. A frequency dividing oscillatory circuit comprising a first and second relaxation oscillator each of which includes an anode and a control grid electrode, a source of electrical impulses the frequency of which is to be divided, means for controlling the natural free-running frequency of oscillation of said first oscillator at a value slightly less than one-half the recurrence rate of pulses from said source, means for controlling the natural free-running frequency of oscillation of said second oscillator at a value less than one-half that of said first oscillator, connecting circuit means interconnecting the pulses from said source to each of said control grid electrodes, and pulse conductive circuit means interconnecting the anode of said first oscillator and the control electrode of said second oscillator.

8. A frequency dividing oscillatory circuit comprising a first and second relaxation oscillator each of said oscillators including an anode and a control grid electrode, a source of electrical impulses connected to said control electrodes for simultaneously supplying thereto a train of impulses the frequency of which is to be divided, a pulse conductive circuit interconnecting the anode of said first oscillator and the control electrode of said second oscillator and a second pulse conductive circuit interconnecting the anode of said second oscillator and the control electrode of said first oscillator.

9. A frequency dividing oscillatory circuit in accordance with claim 8 in which the anode circuit of each oscillator is inductively coupled to the control electrode of the other oscillator.

10. A frequency dividing oscillatory circuit comprising a first and second relaxation oscillator each of which includes an anode and a control grid electrode, a source of substantially constant frequency electrical impulses, circuit connecting means interconnecting said source and the control grid electrode of each of said oscillators for simultaneously supplying thereto pulses from said source, and pulse conductive means interconnecting said first and second oscillators for supplying to said second oscillator voltage impulses arising in said first oscillator whereby alternate impulses from said source are suppressed in the control grid electrode circuit of said second oscillator.

11. The frequency dividing oscillatory circuit of claim 10 in which the anode of said second oscillator is interconnected through pulse conductive circuit means with the control electrode of said first oscillator.

12. A frequency dividing oscillatory system comprising a first and second relaxation oscillator each of which includes a control grid and an anode electrode, a source of substantially constant-frequency electrical impulses connected to said control electrodes, and means including the voltage variations arising in the anode circuit of said first oscillator for suppressing in the control grid electrode circuit of said second oscillator the alternate electrical impulses from said source.

13. A frequency dividing oscillatory system in accordance with claim 12 and means including the space discharge path of a third electron discharge device for interconnecting the anode circuit of said second oscillator and the control grid electrode circuit of said first oscillator.

14. A frequency sensitive system for dividing only by an odd numbered integer the frequency of pulses from a source of electrical impulses of substantially constant frequency, which system comprises a first and second relaxation oscillator in tandem connection, each of which includes an electron discharge device having an anode, a cathode, and a control grid electrode, circuit means interconnecting each of said control electrode circuits in parallel connection to the output of said source, means utilizing the current variations in said first oscillator for cancelling each alternate electrical impulse from said source in the control grid circuit of said second oscillator, and means for initiating current conduction in said first oscillator in synchronism with current conduction in said second oscillator.

15. A frequency sensitive system in accordance with claim 14 in which said means for causing current conduction in said first oscillator in synchronism with current conduction in said second oscillator comprises a unidirectional conducting path interconnecting the anode circuit and grid circuit of said second and first oscillators, respectively.

16. A frequency dividing system comprising a first and a second frequency dividing device, each including an input circuit, a source of substantially constant frequency electrical impulses, means for simultaneously supplying said impulses to said input circuits, and means for cancelling each alternate impulse in the input circuit of said second device.

17. In a frequency dividing system comprising a first and second frequency dividing device in tandem connection, each of said devices including an input circuit, a source of electrical impulses the frequency of which is to be divided, means for simultaneously supplying said impulses to each of said input circuits and means responsive to the frequency-dividing operation of said first device to annul in the input circuit of said second device each alternate one of said supplied impulses.

JACK A. BAIRD.

REFERENCES CITED

The following references are of record in the file of this patent:

UNITED STATES PATENTS

| Number | Name | Date |
|---|---|---|
| 2,418,568 | Bauer | Apr. 8, 1947 |
| 2,444,890 | Hite et al. | July 6, 1948 |